United States Patent [19]

Stanistreet et al.

[11] 4,141,460

[45] Feb. 27, 1979

[54] FIRE PROTECTION MEANS COMPRISING A NON-WOVEN FIBROUS STRUCTURE OF THERMALLY BONDED CONJUGATE FIBERS

[75] Inventors: Harold P. Stanistreet, Harrogate, England; Peter F. Jowitt, c/o Procurement Executive, Ministry of Defence, London, England

[73] Assignees: Imperial Chemical Industries Limited; Peter Frederick Jowitt, both of London, England

[21] Appl. No.: 859,109

[22] Filed: Dec. 8, 1977

[30] Foreign Application Priority Data

Dec. 14, 1976 [GB] United Kingdom ............... 52077/76

[51] Int. Cl.$^2$ .............................................. B67D 5/60
[52] U.S. Cl. .................................. 220/88 A; 428/288; 428/296; 428/338; 428/373; 428/920
[58] Field of Search ............... 428/288, 296, 332, 338, 428/369, 370, 373, 374, 920; 156/306, 497, 498, 555; 220/88 A, 88R

[56] References Cited

U.S. PATENT DOCUMENTS

| 3,595,731 | 7/1971 | Davies et al. ...................... 156/306 |
|---|---|---|
| 4,068,036 | 1/1978 | Stanistreet ........................... 428/296 |

Primary Examiner—James J. Bell
Attorney, Agent, or Firm—Cushman, Darby & Cushman

[57] ABSTRACT

A fuel tank for a vehicle contains therein a flame arrestor comprising a thermally bonded, non-woven fibrous structure formed from fibers comprising at least 90% potentially adhesive conjugate fibers having a decitex within the range 6 to 35, the non-woven fibrous structure having a density of not more than 16 g per liter and a surface area of at least 0.35 m$^2$ per liter, the fibers in the fibrous structure being thermally bonded to at least one other fiber.

1 Claim, No Drawings

FIRE PROTECTION MEANS COMPRISING A NON-WOVEN FIBROUS STRUCTURE OF THERMALLY BONDED CONJUGATE FIBERS

The present invention relates to a fuel tank for a vehicle having a means for suppressing fire.

By the term "vehicle" is meant a means for transporting persons and/or goods by land, sea, or air.

Many vehicles are propelled by engines which use as their source of energy highly flammable gases or liquids stored in fuel tanks of the vehicle. The fuel tanks present a fire hazard, and it is well known that the hazard may be reduced by incorporating into the tank flame arrestors in the form of knitted wire and wire gauzes. The flame arrestors have a large surface area to volume ratio, and function by the surface cooling the flame by heat transference and by absorbing the active radicals which precede an advancing flame. Although these metal flame arrestors are effective, they are not very suitable for incorporating into fuel tanks of vehicles because of their weight, and, in the case of collapsable tanks, their rigidity.

It has been proposed in British Pat. Specifications Nos. 1 341 693 and 1 380 420 to overcome the problems of weight and rigidity by using openly reticulated foam as a flame arrestor, for example a polyurethane foam. In a flame arrestor of this type, not only must the foam have a large surface area to volume ratio, but also a high porosity to enable the fuel to rapidly percolate through the structure during the filling of the tank, and also during occasions when the engine is required to deliver maximum power. Reticulated foam flame arrestors have not proved to be particularly suitable because they are attacked by the fuel, particularly hot fuel. Furthermore, the reticulated foam has a relatively high density in the range of 12–30 g per liter.

British Pat. Specification No. 1 453 836 describes the use of a fibrous flame arrestor. In a preferred form the flame arrestor is a thermally bonded fibrous structure comprising a mixture of approximately equal proportions of homofil fibres having a decitex in the range 111 to 222 and conjugate fibres having a decitex not exceeding 33.3. The homofil fibres provide the basic reticulated structure and the required rigidity thereof whereby it can withstand compressive forces during, for example, filling of the tank and surging of the fuel during movement of the tank. On the otherhand, the conjugate fibres provide a means of bonding the homofil fibres together. The preferred flame arrestors, however, are not entirely satisfactory because the necessary high surface area to volume ratio can only be obtained at relatively high densities (of the order of 45 g per liter) due to the use of filaments having a high decitex. Furthermore, because of the use of a blend of approximately equal amounts of the high decitex homofil fibres and conjugate fibres, it is very difficult to produce a thermally bonded structure in which all of the fibres are adhered without thermally degrading the fibres. The presence of any unadhered fibres is undesirable in that they tend to be removed from the structure during drainage of the tank and subsequently block the fuel filters, thus starving the engine of fuel.

We have now found that it is possible to produce a fibrous flame arrestor having the required porosity and compression properties and also a high surface area to volume ratio without the use of more than 10% of high decitex fibres. Moreover, because the arrestor contains a small amount of or even no high decitex fibres, essentially all the fibres are thermally bonded to each other, whereby the chances of filter blockage is considerably reduced.

Therefore, according to the present invention, a fuel tank for a vehicle contains therein a flame arrestor comprising a thermally bonded, non-woven fibrous structure formed from fibres comprising at least 90% potentially adhesive conjugate fibres having a decitex within the range 6 to 35, the non-woven fibrous structure having a density of not more than 16 g per liter, preferably not more than 12 g per liter, and a surface area of at least 0.35 $m^2$ per liter, preferably at least 0.7 $m^2$ per liter, the fibres in the fibrous structure being thermally bonded to at least one other fibre. Preferably the non-woven fibrous structure has a compression modulus in the range 5 to 20%.

The non-woven fibrous structure may completely fill the fuel tank, or it may only occupy part of the upper portion of the tank. It may be in the form of a single unit or a number of multiple units, preferably each unit having a shape and size whereby it may be introduced into the tank through a charging or discharging port.

Conjugate fibres from which the non-woven structure is made are of the potentially adhesive type in which the components of the fibres extend along the length of the fibre, one of the components having a lower softening temperature than the other component(s) and forming at least part of the peripheral surface of the fibre. The conjugate fibres may be of the side-by-side type, in which case the component having the lower softening temperature preferably forms 40 to 60% by weight of the fibre cross-section. In order to facilitate the thermal bonding of the fibres it is preferable that the side-by-side conjugate fibres are of the crimp reversing type described in British Pat. Specification No. 1 073 181. Desirably the conjugate fibres are of the sheath/core type, the sheath comprising 10 to 55% preferably 20 to 50% of the fibre cross-section. The components of the conjugate fibre are selected so that the fibre can withstand the conditions developed in the fuel tank.

The non-woven fibrous structure may be formed entirely of conjugate fibres, or it may comprise up to 10% of fibres formed from a single component having a softening temperature higher than the softening temperature of the lower softening component of the conjugate fibres. The use of single component fibres having a decitex greater than 35, particularly greater than 100, increases the stiffness of the resulting non-woven fibrous structure. Higher levels of single component fibres reduce the possibility of each fibre being thermally bonded to at least one other fibre, and also reduces the ratio of surface area to volume for a given fibrous structure density.

Conjugate fibres forming the non-woven fibrous structure have a decitex within the range 6 to 35. Structure comprising fibres having a decitex less than 6 do not generally have the required density or porosity. This is because the modulus of the fibres at the temperature necessary to thermally bond the fibres is very low causing the structure to at least partially collapse. On the other hand, fibres having a decitex greater than 35 are not only difficult to produce by the conventional air-quench melt-spinning process, but also reduce the efficiency of blending the fibres during carding.

The non-woven fibrous structure has a density of not more than 16 g per liter, preferably not more than 12 g per liter and desirably not more than 9 g per liter in order to reduce the additional weight carried by the vehicle. Preferably, the structure has a compression modulus within the range 5 to 20%. Structures having a modulus less than 5% tend to be flattened during high speed filling of the fuel tank. On the other hand, structures having a modulus greater than 20% are difficult to insert into the fuel tank.

In order for the non-woven fibrous structure to be an efficient flame arrestor by reducing or even quenching flame propogation, the structure must have a surface area of at least 0.35 m$^2$ per liter, and preferably at least 0.7 m$^2$ per liter.

To prevent the possibility of any loose, unattached fibres being removed from the fibrous structure by the fuel during its removal and subsequently blocking fuel filters, essentially every fibre in the non-woven structure is thermally bonded to at least one other fibre. This feature is one which is not ordinarily present in the conventional non-woven structures. This bonding feature is achieved by carefully controlling the bonding conditions, such as, for example, by increasing the time for which the structure is held at the bonding temperature. Increasing the bonding temperature does not produce the same effect. In fact higher bonding temperatures can be deleterious in that they reduce the modulus of the fibres thereby causing at least a partial collapse of the structure during the thermal bonding of the fibres. Collapse of the structure results in an excessive increase in the density of the final produce.

Because the fibres occupy less than 1.5% of the volume of the structure, the structure is highly porous. This allows the rapid percolation of fuel through the flame arrestor as or when necessary.

The non-woven fibrous structures suitable for insertion into fuel tanks to act as flame arrestors may be conveniently prepared by carding conjugate fibres, or a blend of conjugate fibres containing not more than 10% of fibres formed from a single component, the fibres having at least one crimp per extended cm, and layering the carded fibres to form a sheet having a thickness of at least 10 cm, and a density of not more than 8 g per liter. The sheet is preheated, preferably by the upward flow through the sheet of a heated gas, to a temperature not exceeding 5° C. below the softening temperature of the lower softening component of the conjugate fibres, followed by heating the sheet for at least 30 seconds and preferably at least 60 seconds at a temperature above, but not greater than 10° C. above, the softening temperature of the lower softening component of the conjugate fibre. The heating is by the upward passage through the sheet of a heated gas. The heated sheet may then be given a slight compression in order to bring the fibres closer together whereby each fibre becomes thermally bonded to at least one other fibre. Finally, the bonded sheet is rapidly cooled, preferably by the upward passage of a gas, to a temperature below the softening temperature of the lower softening component.

The invention will be further described by way of example with reference to the following example.

Crimped conjugate staple fibres each of 13 decitex and having a core of nylon-66 and a sheath of nylon-6 (core:sheath ratio 1:1), and a staple length of 65 mm, was carded and then cross-folded to give a 250 mm thick batt having a density of 7 g per liter. The batt was preheated for 4 seconds in an upflow of air having a temperature of 145° C., then thermally bonded for 2 minutes at 227° C. by subjecting it to an upward flow of super heated steam, and finally rapidly cooled in an up flow of air. A thermally bonded non-woven fibrous structure was obtained having a density of 8.3 g per liter, a surface area above 0.75 m$^2$/liter and a compression modulus in the range 6 to 14%. Examination of the structure indicated that each fibre was thermally bonded to at least one other fibre.

A flexible aircraft fuel tank was fitted with the fibrous structure and then filled with fuel. Firing tests on the tank indicated that the fibrous structure was an effective, light weight flame arrestor.

The compression modulus of the non-woven fibrous structure was measured by loading the surface of a 100 mm cube of the structure at a level of 100 g per cm$^2$ and measuring the degree of compression.

We claim:

1. A fuel tank for a vehicle containing therein a flame arrestor, said flame arrestor, comprising a thermally bonded, non-woven fibrous structure formed from fibers comprising potentially adhesive conjugate fibers in which the components extend along the length of the fiber, one of the components having a lower softening temperature than the other components and forms at least part of the peripheral surface of the fiber wherein the non-woven fibrous structure is formed from fibers comprising at least 90% of potentially adhesive conjugate fibers having a decitex in the range 6 to 35, the non-woven fibrous structure having a density of not more than 16 g per liter and a surface area of at least 0.35 m$^2$ per liter, the fibers in the fibrous structure being thermally bonded to at least one other fiber.

* * * * *